United States Patent [19]

Dobbins et al.

[11] Patent Number: 4,727,245

[45] Date of Patent: Feb. 23, 1988

[54] PORTABLE DATA SCANNER WITH REMOVABLE MODULAR PRINTER

[75] Inventors: Bob M. Dobbins, Villanova; John Zouzoulas, West Chester, both of Pa.; Robert D. Ross, Gibbsboro, N.J.

[73] Assignee: Mars, Inc., McLean, Va.

[21] Appl. No.: 918,508

[22] Filed: Oct. 14, 1986

[51] Int. Cl.[4] .............................................. G06K 7/10
[52] U.S. Cl. ...................................... 235/472; 235/432
[58] Field of Search .................................. 235/432, 472

[56] References Cited

U.S. PATENT DOCUMENTS 4,574,371  3/1986  Scheible .............................. 235/472

Primary Examiner—Harold I. Pitts
Attorney, Agent, or Firm—Davis Hoxie Faithfull & Hapgood

[57] ABSTRACT

A printer module for ready attachability to a portable data scanner to form an integrated portable unit is described. The printer module includes a symmetrical printer cartridge, having a printer mechanism, a printer mechanism control circuit and a paper supply. The symmetrical printer cartridge being readily removable and rotatable to facilitate lefthanded and righthanded usage. The printer module further including a bayonet configured locking arrangement to facilitate mechanical and electrical connection of the printer module with the portable data scanner.

20 Claims, 8 Drawing Figures

PORTABLE DATA SCANNER WITH REMOVABLE MODULAR PRINTER

FIELD OF THE INVENTION

The present invention relates generally to an integrated, self-contained handheld data scanner apparatus, and particularly to a removable printer module for use in conjunction with such apparatus.

DESCRIPTION OF THE PRIOR ART

Bar code symbols consisting of a strip of alternating dark bars and light spaces, and bar code scanners for reading bar codes, have become widely used in many industries for a variety of tasks. For example, one large overnight package delivery service has recently advertised the use of bar codes and a handheld bar code scanner for purposes of computerized tracking of the location of packages from their time of pickup until their delivery.

Currently existing bar code scanners fall into several categories. For example, optical wands of both the contact and non-contact variety are well known. See, e.g., U.S. Pat. Nos. 4,471,218, 4,467,196, 4,354,101, 4,158,194 and 4,118,667. The typical bar code reading wand is a pen-like device having a light source and photodetector located in its tip. The tip of the wand is either rubbed in contact with or waved in close proximity to the bar code symbol. The photodetector senses changes in the reflectance of the symbol as the tip crosses the dark bars and light spaces of the symbols. Typically, the bar code symbol to be scanned must be located at a fixed focal distance.

Similarly, stationary laser scanning reading arrangements, in which the bar code symbol is brought to and passed through the area in which a laser beam is focused, are also well known. See, for example, U.S. Pat. Nos. 4,095,095, 4,093,865 and 4,057,784. These units, as well as units such as the portable desk top laser scanning workstation described in U.S. Pat. No. 4,369,361, have a wider range of focal distances at which they are operable than the typical bar code reading wands. They are well adapted to operation in applications such as the checkout counter at a grocery or retail store, but are not suitable for handheld usage, in which the bar code scanner must be repeatedly moved to the location of the bar code symbols to be scanned.

Various handheld laser scanner arrangements with varying degrees of portability are known. See, for example, U.S. Pat. Nos. 4,460,120, 4,409,470, 4,387,297, 4,360,798 and 4,251,798. U.S. Pat. No. 4,251,748, for example, describes a portable scanning head having a carrying handle, a keyboard, and first and second displays. This portable scanning head is electrically connected to a console including a printer by an electrical cable, and is designed for reading barcodes such as those found on the grocery products found in grocery stores. The portable scanning head includes a resilient contact pad which contacts and conforms to the surface on which the bar code symbol to be scanned is imprinted.

U.S. application Ser. No. 913,215 filed Sept. 29, 1986 entitled Portable Data Scanner Apparatus describes a portable self-contained data scanner without umbilical cords, but does not disclose the details of a removable printer module.

SUMMARY OF THE PRESENT INVENTION

Briefly, the present invention describes a removable printer module and the details of mechanical and electrical interconnection to a portable data scanner so that a lightweight portable unit including a printer is provided. The removable printer preferably includes a reversible printing cartridge arrangement so that the overall unit may be readily adapted for easy usage by both lefthanded and righthanded operators.

Additional details, features and advantages of the present invention are clear from the drawings, and the detailed discussion below.

DETAILED DESCRIPTION

Figure 1:
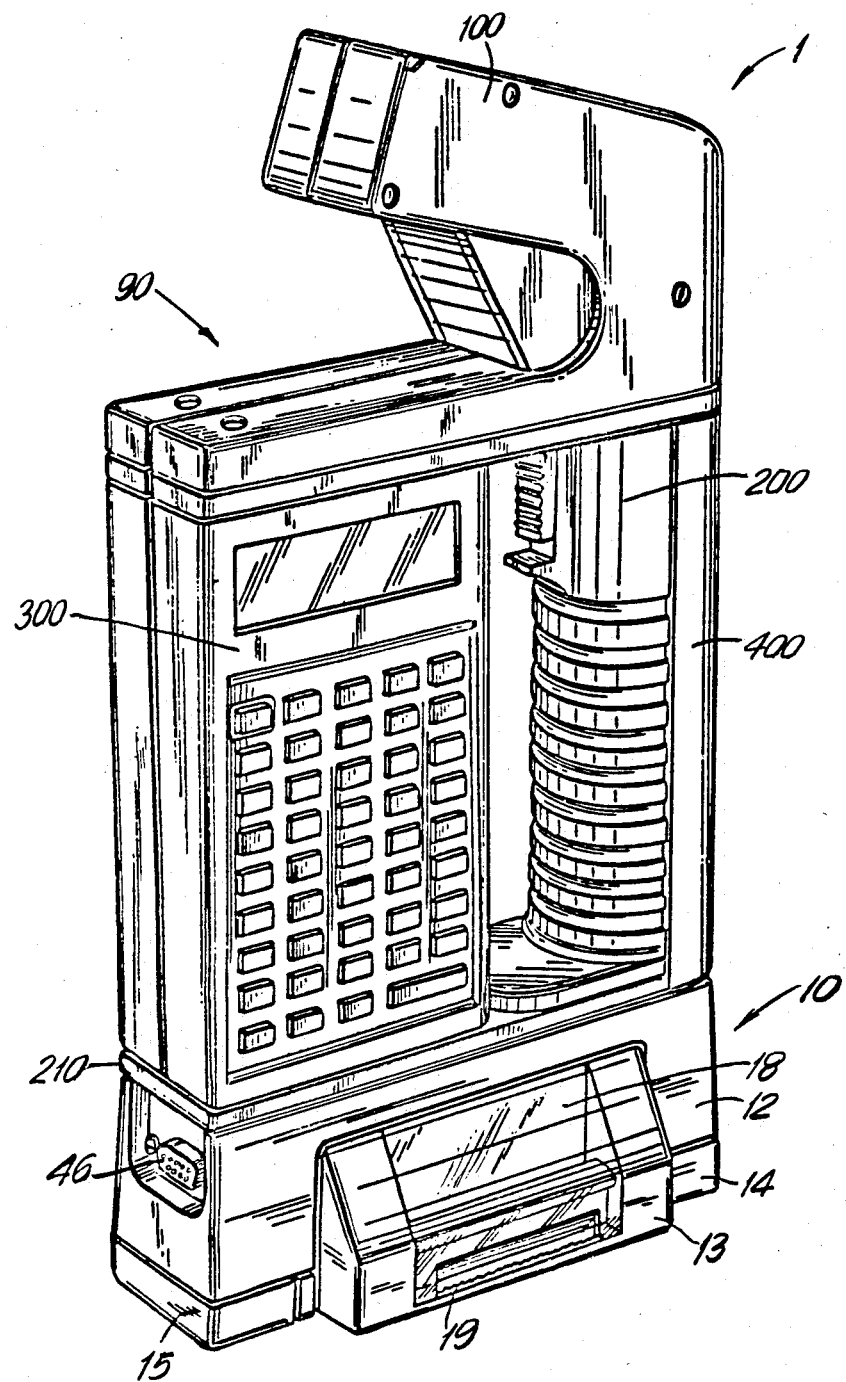
FIG. 1 is an isometric view of a portable data scanner with a removable printer module according to the present invention.

The presently preferred embodiment of the present invention is illustrated in FIGS. 1–8. FIG. 1 illustrates an overall unit 1 comprising an integrated self-contained laser based bar code scanner apparatus 90 interconnected to a printer module 10 constructed according to the present invention. The preferred self-contained apparatus 90 shown in FIG. 1 is rugged, compact, lightweight and intended for long periods of uninterrupted handheld use for noncontact barcode scanning over a range of focal distances in a variety of environments. These characteristics are desirable because it is expected that that apparatus will be carried by the operator to various locations. Further, the apparatus 90 eliminates interconnecting cables and belt mounted components. Consequently, the repetitive scanning of bar codes with the present apparatus can be a one-handed operation allowing the other hand free for other functions. The printer module 10 is designed consistently with the objectives of the apparatus 90 so that unit 1 is also portable and integrated.

The self-contained apparatus 90 includes a number of modules: a scanner module 100, a frame module 200, a data module 300, including one or more data processing components, and a removable, rechargeable battery module 400 combined to achieve the beneficial result of true portability in a single integrated unit without power or data transfer cabling to separate power packs or data processing apparatus.

The details of the various modules and their arrangement and connection are not the subject of the present invention, however, these details are included in U.S. application Ser. No. 913,215 filed on Sept. 29, 1986 which is incorporated herein by reference.

Figure 2:
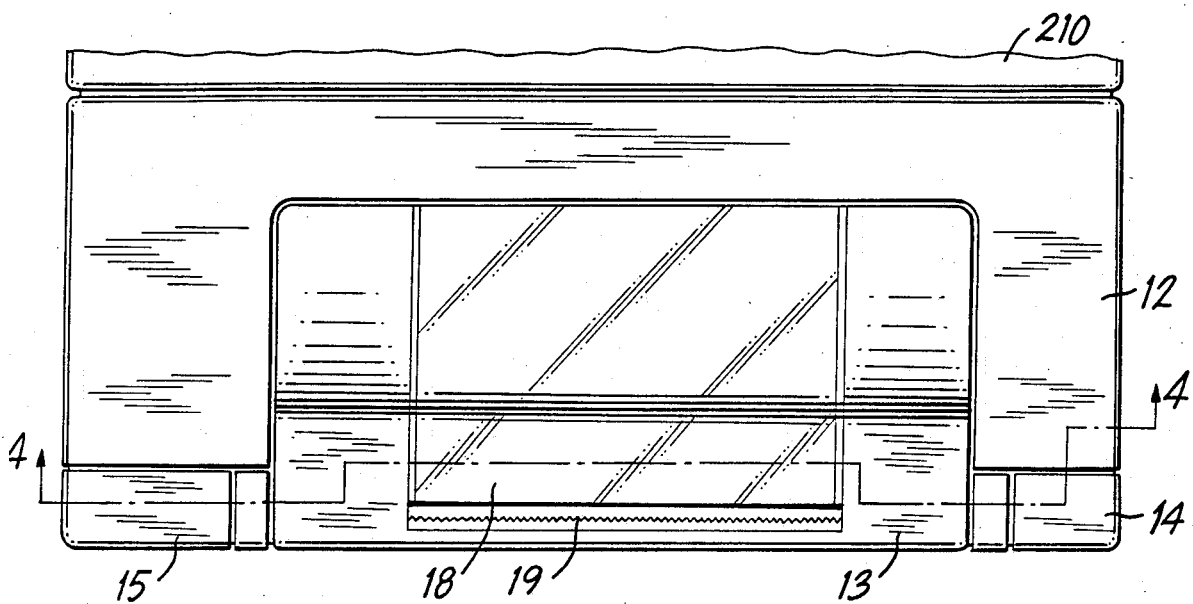
FIG. 2 shows the printer module and the base of the portable data scanner with the remainder of the portable data scanner cutaway.

The details of printer module 10 are illustrated in FIGS. 2–8. In FIG. 2 which is a front view of printer module 10, the exterior components of printer module 10 are shown. The printer module 10 is mechanically and electrically connected to base 210 of frame module 200 of the portable data scanner apparatus 90. Only a portion of the base 210 is shown in FIG. 2. Printer module 10 is a compact unit having an outer housing 12, a printer cartridge 13, two end caps 14 and 15, a clear facing 18 allowing the operator to see when paper needs to be added, and a serrated edge 19 for cutting off printer paper.

The printer cartridge 13 fits into the outer housing 12 and the two end caps 14 and 15 along with a pair of pivot clamps 30 and 31 (shown in FIG. 5) lock the cartridge 13 in place in the housing 12 as will be further discussed below. By releasing clamps 30 and 31, the cartridge 13 can be readily removed. Cartridge 13 can be removed, rotated 180°, and reinserted in the housing 12 so that the paper of the printer module will exit on the opposite side of the printer module 10. This reversibility which will be discussed in greater detail below gives printer module 10 great flexibility for either right-handed or lefthanded operation.

Figure 3:
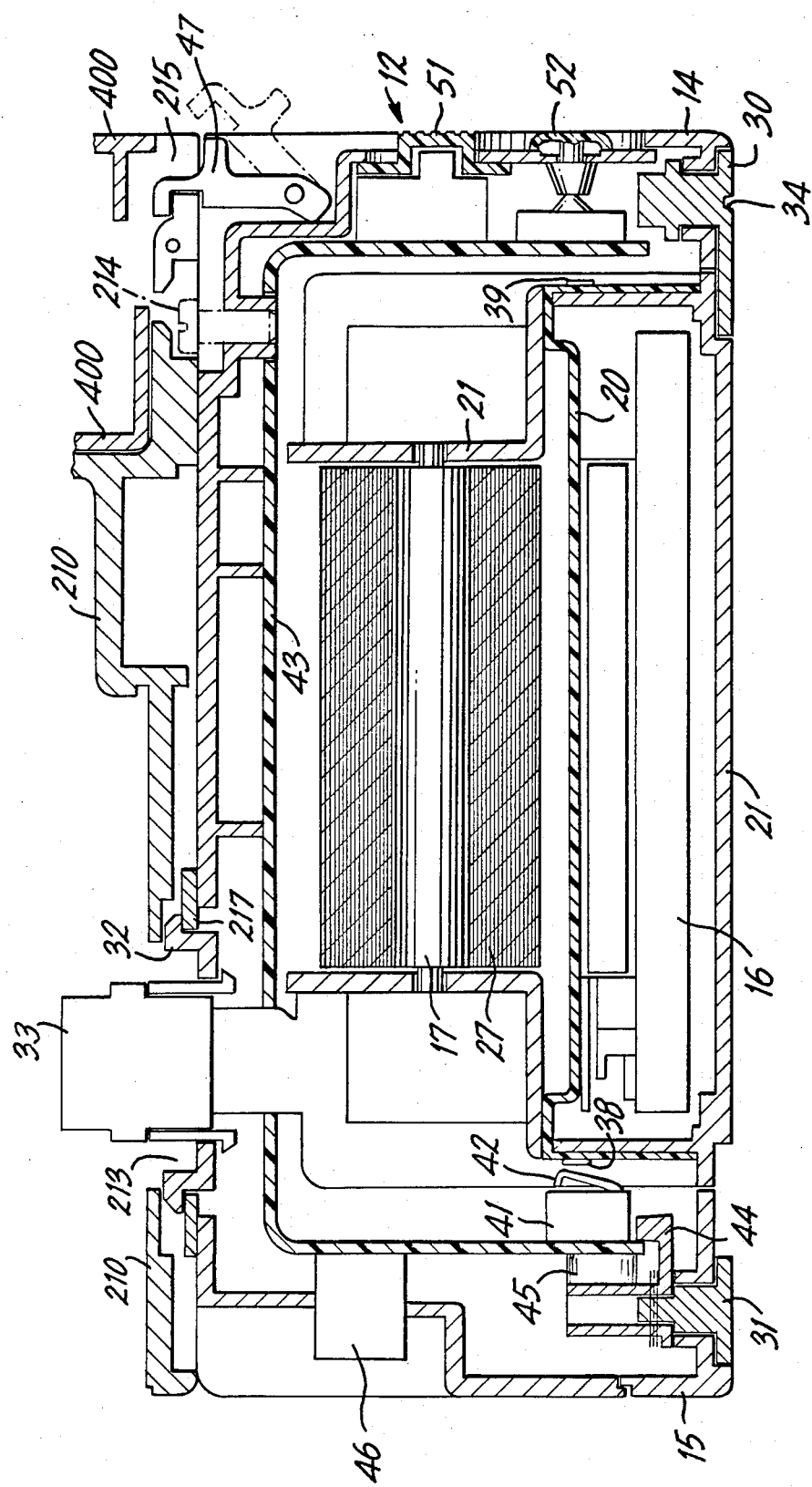
FIG. 3 is a sectional view of the printer module and the portable data scanner base.

FIG. 3 is a sectional view which illustrates various internal details of printer module 10 relevant to the interconnection of apparatus 90 and printer module 10, and the reversibility of the printer cartridge 13.

The printer cartridge 13 includes a printer mechanism 16, a paper roll mandrel 17 which will typically have a roll of paper 27 mounted on it, and a printed circuit board 20, all of which are housed within a symmetrical printer cartridge housing 21. Printer cartridge 13 also includes a pair of electrical contact surfaces 38 and 39 symmetrically mounted on the opposite ends of the housing 21. Because the printer cartridge housing 21 is symmetrical, it and the printing components housed therein can be removed, rotated 180°, and placed back into the outer housing 12 of printer module 10. The details of the electrical connection of control signals and power to printer cartridge 13 in a manner which is consistent with the above reversibility are discussed below.

Figure 4:
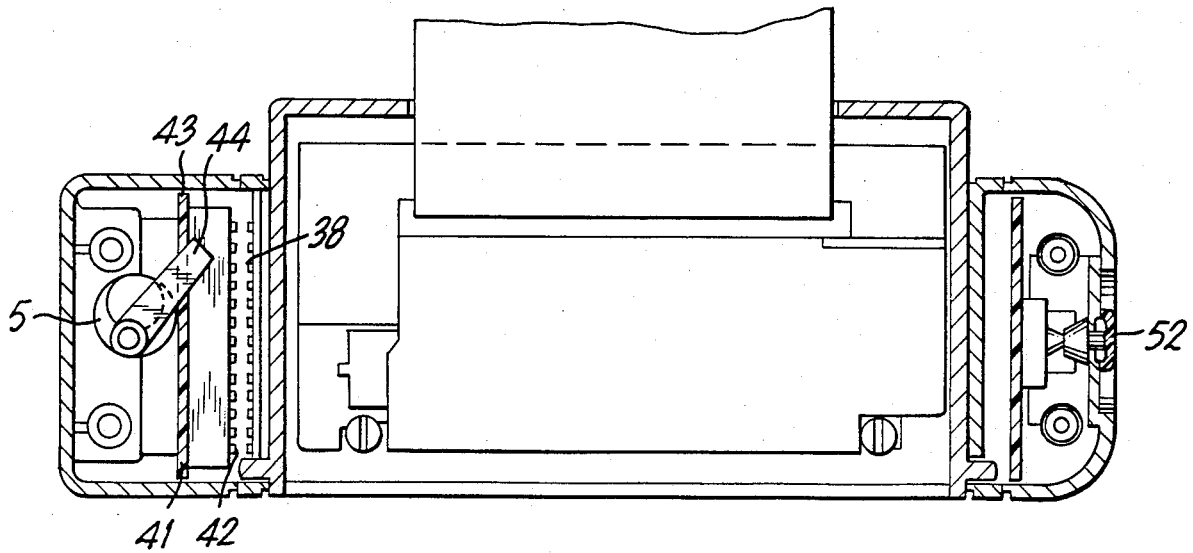
FIG. 4 is a sectional bottom view along the line 4—4 of FIG. 2 of the printer module.

As shown in FIG. 3, the electrical contact surface 38 is located adjacent an electrical connector 41 with a spring biased contact pad 42. As shown in FIG. 4, the contact pad 42 includes a plurality of contact strips or fingers which make contact with corresponding strips or fingers of the contact surface 38 (or surface 39 if cartridge 13 is reversed). In Fig. 3, the spring biased contact 42 is shown in a recessed position so that electrical contact is not made to the contact surface 38 of printer cartridge 13. As shown in FIG. 3, the pivot clamp 30 is in a closed position and clamp 31 is in an open position. When both pivot clamps are open, the printer cartridge 13 can be readily removed. When both pivot clamps are closed, as shown in FIG. 5, the printer cartridge 13 is locked in place.

When clamp 31 is in its open position, the spring biased contact pad 42 is recessed, however, when clamp 31 is rotated to its closed position clamping the cartridge 13 in place, then contact pad 42 is biased in contact against contact surface 38. The electrical connector 41 is mounted on a flexible printed circuit board 43. As shown in FIG. 4, one end of printed circuit board 43 is anchored by a flange 44 which is part of an eccentric cam 45 which is attached to the pivot clamp 31. Pivot clamp 31 is in turn attached to the end cap 15. As discussed above, in their open position, the pivot clamps 30 and 31 are pivoted clear of the printer cartridge 13. Pivot clamp 31 while in the open position (shown in dashed lines in FIG. 5) causes the flange 44 to hold the printed circuit board 43, the electrical connector 41 and the spring biased contact pad 42 away from the printer cartridge 13 as shown in FIG. 3.

Figure 5:
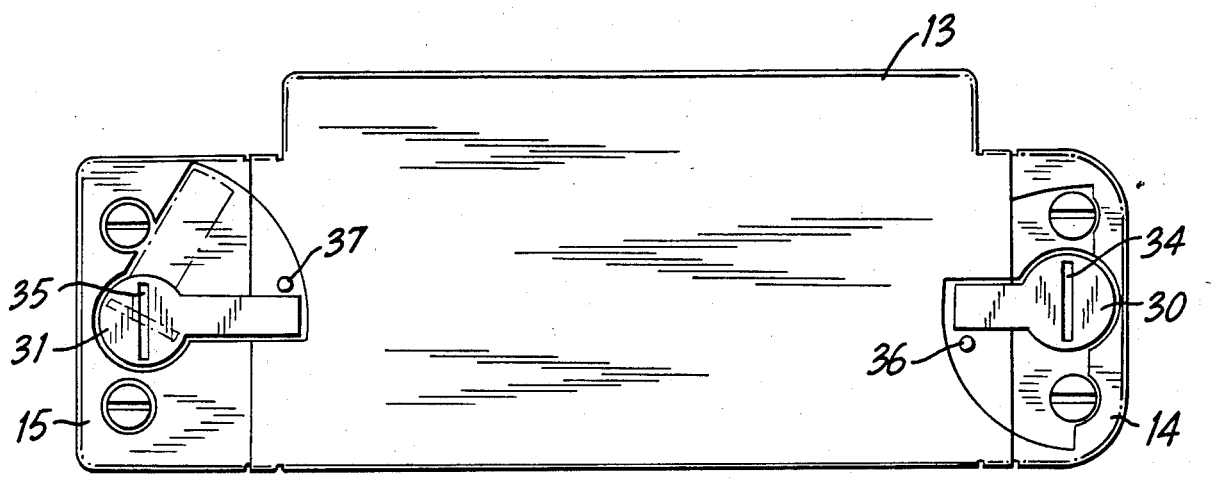
FIG. 5 is a bottom view of the printer module.

As shown in FIG. 5, the pivot clamps 30 and 31 include slots 34 and 35 respectively which facilitate rotation of the pivot clamps. For example, the operator may use a U.S. 10 cents coin to provide leverage to lock and unlock the pivot clamps. Additionally, detents 36 and 37 hold the clamps 30 and 31 locked in their closed position.

Rotating the pivot clamp 31 to the closed position shown in FIG. 5 causes the cam 45 (best seen in FIG. 4) to push against the printed circuit board 43 causing it to flex, and its end along with electrical connector 41 and contact pad 42 to move so that contact pad 42 makes electrical contact with the electrical contact surface 38 of printer cartridge 13. Both of the contact surfaces 38 and 39 are rigidly mounted while the printed circuit board 43 is preferably constructed of a semi-rigid type of material such as Bend/flex made by Rogers Corp., Poren and Composites Division, 1 Tech Drive, Rogers, CT. This semi-rigid material allows the flexing described above and for some motion as contact pad 42 is biased against contact surface pad 38.

Figure 7:
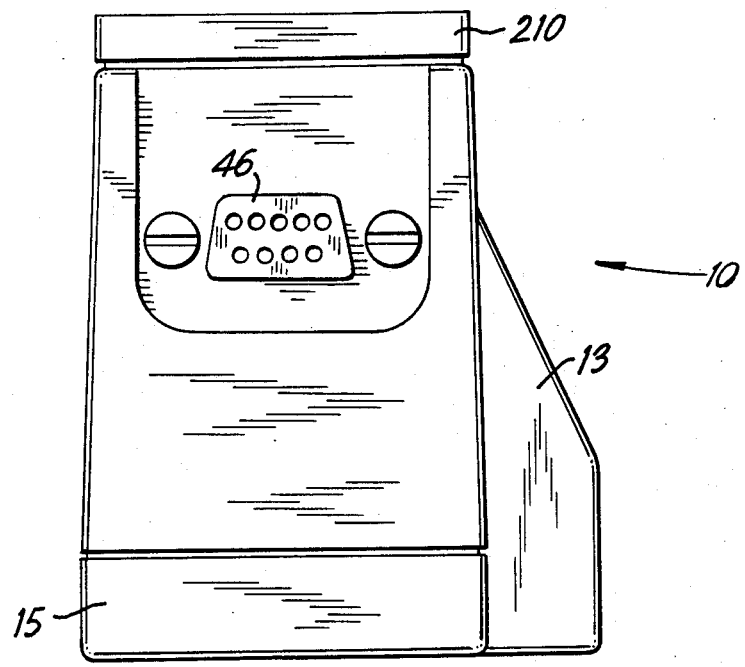
FIG. 7 is a second side view of the printer module.

As can best be seen in FIG. 3, the printed circuit board 43 extends upwardly from its end having the electrical connector 41 to make electrical connection with an input output electrical connector 46 which is preferably an RS 232 connector for the input or output of data to or from the unit 1 including the printer module 10. FIG. 7 illustrates the external appearance of this connector 46, as well as, a side view of the printer module 10 attached to the base 210 of the apparatus 90.

Printed circuit board 43 also includes an electrical connector 33 which is electrically connected to an electrical connector in apparatus 90. To summarize, data, control signals such as for controlling the operation of printer mechanism 16 and power from apparatus 90 are electrically connected through the electrical connector 36 to printed circuit board 43. The board 43 connects these data, control and power signals to the connector 33 so that data can be output from the overall unit 1 provided these signals are for external use. If information is to be printed, then printed circuit board 43 connects the signals through connector 41, spring biased contact pad 42 and surface contact 38 to the printed circuit board 20 in the printer cartridge 13. Printed circuit board 43 contains control circuitry for controlling the printer mechanism 16 and printer circuit board 20 connects control signals to the printer mechanism 16. Printer mechanism 16 causes the information to be printed on the paper of paper roll 27.

Figure 8:
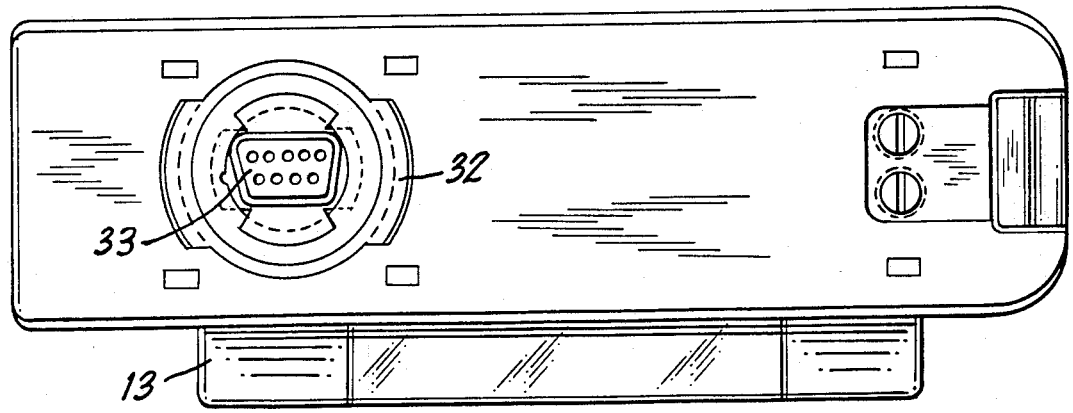
FIG. 8 is a top view of the printer module.

Turning to the details of the mechanical and electrical connection of printer module 10 to a portable data scanner apparatus such as the apparatus 90, the preferred mechanical connection is an interlocking one made with a bayonet configuration as illustrated in FIGS. 3 and 8. Other interlocking means may be used.

The interlocking means includes a collar 32 which is preferably a molded part of outer housing 12. Collar 32 has a bayonet configuration as shown in FIG. 8 which allows the printer module 10 to be mounted to an interface connector opening 213 in base 210 of the portable data scanner apparatus 90. Locking is achieved via a bayonet lock ring 217 which is also part of the base 210.

Mechanical interconnection is summarized as follows. The collar 32 of printer module 10 is inserted into opening 213 with the printer module 10 positioned orthagonally to the base 210 of the portable data scanner apparatus 90. Then, the printer module 10 is rotated so that it is aligned with the base 210. It is noteworthy that printer module 10 can be readily rotated between the orthagonal and aligned positions. Such rotation allows ready access to the base of the apparatus 90, and allows access to a locking screw 214 which locks battery module 400 in place. Once the printer module 10 is aligned with base 210, it is latched in place by a latch 47 which snaps into a molded recess 215 in the base 210. Latch 47 pushes to lock-on and pulls to unlock-off (off position is shown in dashed lines in FIG. 3).

Electrical connection between printer module 10 and data scanner apparatus 90 is made as follows. An electrical connector 33 seen from the top in FIG. 8 and from the side in FIG. 3 is manually set to a detent position in which it is properly aligned with the opposing electrical connector in the apparatus 90 when the printer module 10 is orthogonal to base 210 and collar 32 is aligned for insertion into opening 213. This is necessary as the connector 33 is rotatable relative to printer module 10 but stationary relative to apparatus 90. Proper electrical interconnection is automatically made as the printer module 10 is mated through the bayonet opening and pushed up into the base of apparatus 90. This arrangement is particularly beneficial as it requires the operator only to perform the simple task of placing connector 33 in its detent position, to achieve proper alignment, and thereby eliminates a potential source of damage to the connector 33 and the electrical connector in the apparatus 90.

Figure 6:
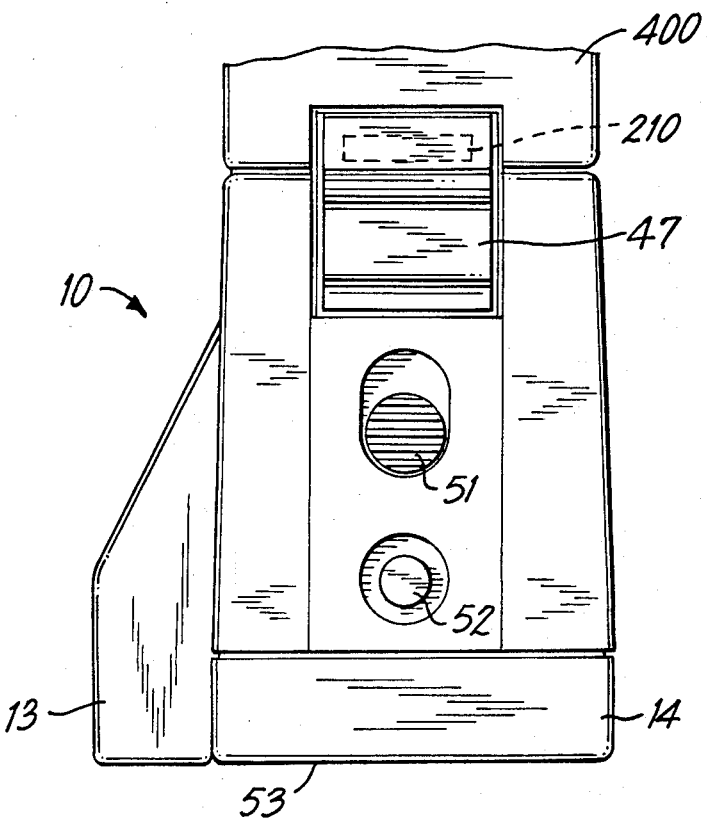
FIG. 6 is a first side view of the printer module.

FIG. 6 is a side view of the printer module 10. As shown in FIG. 6, the printer module 10 preferably includes a slide switch 51 for turning the printer on and off. As shown in FIG. 3, the slide switch 51 is electrically connected to the printed circuit board 43 located inside printer housing 12. Printer module 10 also preferably includes a paper advance switch 52 which is also electrically connected to the printed circuit board 43. Finally, the printer module 10 has a substantially flat base 53 which can serve as the base for the entire unit 1 when the operator wishes to put unit 1 down.

We claim:

1. An integrated portable data scanning and detection apparatus with a removable printer module comprising:
    a scanner module for projecting a light beam and for detecting light from the light beam reflected from an object and producing a first electrical signal representative of the detected light and the scanned object;
    a data module housing one or more components of a data processing means for decoding the first electrical signal into digital data representative of the scanned object;
    memory for storing the digital data;
    a battery module for supplying operational power for the apparatus;
    a frame module for connecting the scanner module, the data module and the battery module into an integrated unit, said frame module comprising a body, a top and a bottom; and
    a printer module which can be readily attached to and detached from the bottom of the frame module.

2. The apparatus of claim 1 wherein the printer module includes interlocking means for connecting to the frame module.

3. The apparatus of claim 2 wherein the printer module is connected to the portable data scanning and detection apparatus by arranging the printer module orthagonally to the major axis of the bottom of the frame module, inserting the interlocking means into a connecting opening in the bottom of the frame module, and rotating the printer module into alignment with the bottom of the frame module.

4. The apparatus of claim 2 wherein the frame module further comprises a bayonet locking ring, and the interlocking means includes a collar which is inserted through the bayonet locking ring and rotated to lock.

5. The apparatus of claim 2 wherein the interlocking means further comprises a self-aligning electrical connector.

6. The apparatus of claim 1 wherein the printer module further comprises a removable, reversible printer cartridge.

7. The apparatus of claim 6 wherein the printer cartridge further comprises a symmetrical outer housing having symmetrically located electrical contact surfaces.

8. The apparatus of either claim 1 or 6 wherein the printer module further comprises a printer cartridge and a flexible printed circuit board connected to a locking cam which is rotated to make electrical connection to the printer cartridge.

9. The apparatus of claim 1 wherein the printer module further comprises a locking clip which pushes to lock and pulls to open.

10. The apparatus of claim 1 wherein the printer module further comprises a data port, and electronic control means to determine whether data is for printing or for another device connected to the data port.

11. The apparatus of claim 1 wherein the printer module further comprises a substantially flat base which can be used as a base for the overall apparatus.

12. A removable printer module comprising:
    an outer housing;
    a reversible printer cartridge comprising a printer mechanism enclosed in a printer cartridge housing;
    an electrical connection surface which is mounted on the printer cartridge housing;
    a flexibly mounted electrical connector;
    means for releasably locking the printer cartridge within the outer housing having an open position in which the printer cartridge can be readily removed and a closed position, in which the printer cartridge is locked in place, said means for releasably locking being connected to the flexibly mounted electrical connector and causing the flexibly mounted electrical connector to be recessed when in the open position and to make contact with the electrical connection surface when in the closed position.

13. The apparatus of claim 12 further comprising interlocking means for connecting the printer module to another apparatus.

14. The apparatus of claim 13 wherein the interlocking means comprises a bayonet arrangement which is inserted into a connecting opening in the other apparatus and rotated to lock the printer module in place.

15. The apparatus fo claim 14 wherein the bayonet arrangement comprises a molded collar on the outer housing.

16. The apparatus of claim 13 wherein the interlocking means further comprises an electrical connector.

17. The apparatus of claim 12 wherein the printer cartridge housing is symmetrical.

18. The apparatus of claim 17 further comprising a second electrical connection surface which is mounted on the printer cartridge housing.

19. The apparatus of claim 12 further comprising a locking clip.

20. The apparatus of any one of the claims 12 through 18 wherein the flexibly mounted electrical connector comprises an electrical contact pad mounted on a flexible printed circuit board.

* * * * *

UNITED STATES PATENT AND TRADEMARK OFFICE
CERTIFICATE OF CORRECTION

PATENT NO. : 4,727,245

DATED : February 23, 1988

INVENTOR(S) : Dobbins, et al.

It is certified that error appears in the above-identified patent and that said Letters Patent is hereby corrected as shown below:

Column 4, line 41, delete "36" and insert --33--.

Claim 15, column 6, line 64, delete "fo" and insert --of--.

Signed and Sealed this

Second Day of May, 1989

Attest:

DONALD J. QUIGG

Attesting Officer

Commissioner of Patents and Trademarks